(12) United States Patent
Schmidl et al.

(10) Patent No.: US 6,965,590 B1
(45) Date of Patent: Nov. 15, 2005

(54) DYNAMIC SLAVE SELECTION IN FREQUENCY HOPPING WIRELESS COMMUNICATIONS

(75) Inventors: Timothy M. Schmidl, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 717 days.

(21) Appl. No.: 09/611,733

(22) Filed: Jul. 7, 2000

Related U.S. Application Data

(60) Provisional application No. 60/185,937, filed on Feb. 29, 2000.

(51) Int. Cl.[7] .............................................. H04J 1/00
(52) U.S. Cl. ...................... 370/343; 370/295; 455/509
(58) Field of Search ................................ 370/278, 281, 370/295, 343, 478; 455/42, 62, 502, 507, 455/509, 512

(56) References Cited

U.S. PATENT DOCUMENTS

| | | | |
|---|---|---|---|
| 4,716,573 A | | 12/1987 | Bergstrom et al. ............. 375/1 |
| 5,394,433 A | * | 2/1995 | Bantz et al. ................ 375/132 |
| 5,581,548 A | * | 12/1996 | Ugland et al. .............. 370/330 |
| 5,737,359 A | * | 4/1998 | Koivu ........................ 375/133 |
| 5,774,808 A | * | 6/1998 | Sarkioja et al. ............. 455/436 |
| 5,937,002 A | * | 8/1999 | Andersson et al. .......... 375/131 |
| 6,295,310 B1 | | 9/2001 | Yamauchi et al. ........... 375/133 |
| 6,366,622 B1 | * | 4/2002 | Brown et al. ................ 375/322 |
| 6,501,785 B1 | * | 12/2002 | Chang et al. ................ 375/133 |
| 6,549,784 B1 | * | 4/2003 | Kostic et al. ................ 455/501 |
| 6,567,459 B1 | * | 5/2003 | Hakkinen et al. ........... 375/132 |

FOREIGN PATENT DOCUMENTS

| | | | |
|---|---|---|---|
| EP | 0 884 858 A2 | 12/1998 | |
| JP | 2002252616 | * 9/2002 | ........... H04L 12/28 |

OTHER PUBLICATIONS

Kostic et al., "Dynamic Frequency Hopping in Wireless Cellular Systems", May 1999, pp. 914-918.*

"Networks for Homes", Amitava Dutta-Roy, Contributing Editor, IEEE Spectrum, Communications, Dec. 1999, pp. 26/33.

* cited by examiner

*Primary Examiner*—John Pezzlo
*Assistant Examiner*—Donald L Mills
(74) *Attorney, Agent, or Firm*—Frederick J. Telecky, Jr.; W. James Brady, III

(57) ABSTRACT

Based on monitored quality of various frequency channels between first and second frequency hopping wireless communication devices, communications between the first and second devices can be scheduled with respect to a predetermined frequency hopping pattern such that communications are advantageously transmitted on selected frequencies that are more likely than others to provide acceptable communication performance.

31 Claims, 9 Drawing Sheets

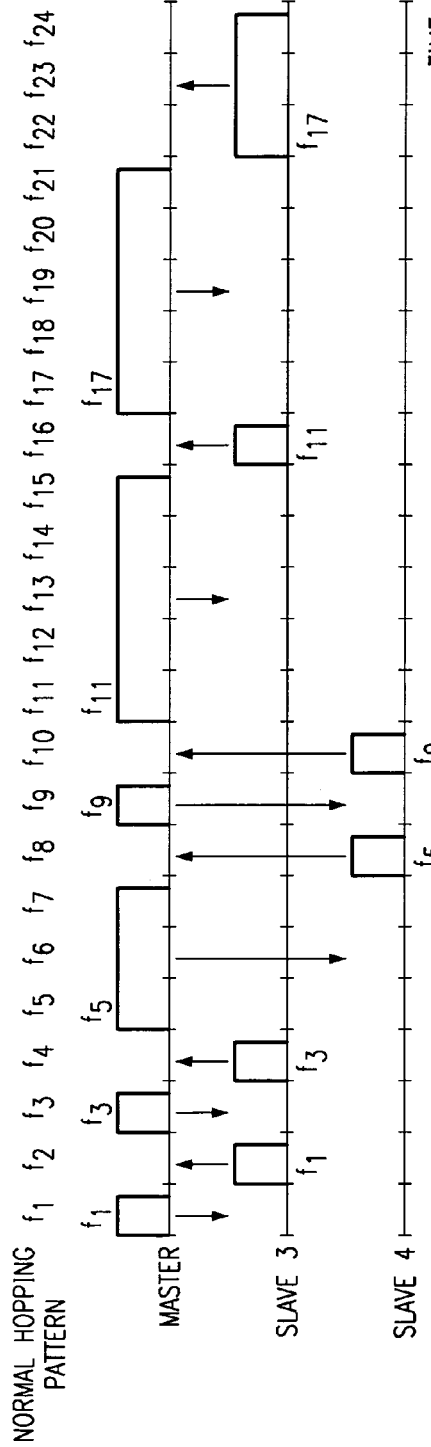
FIG. 3
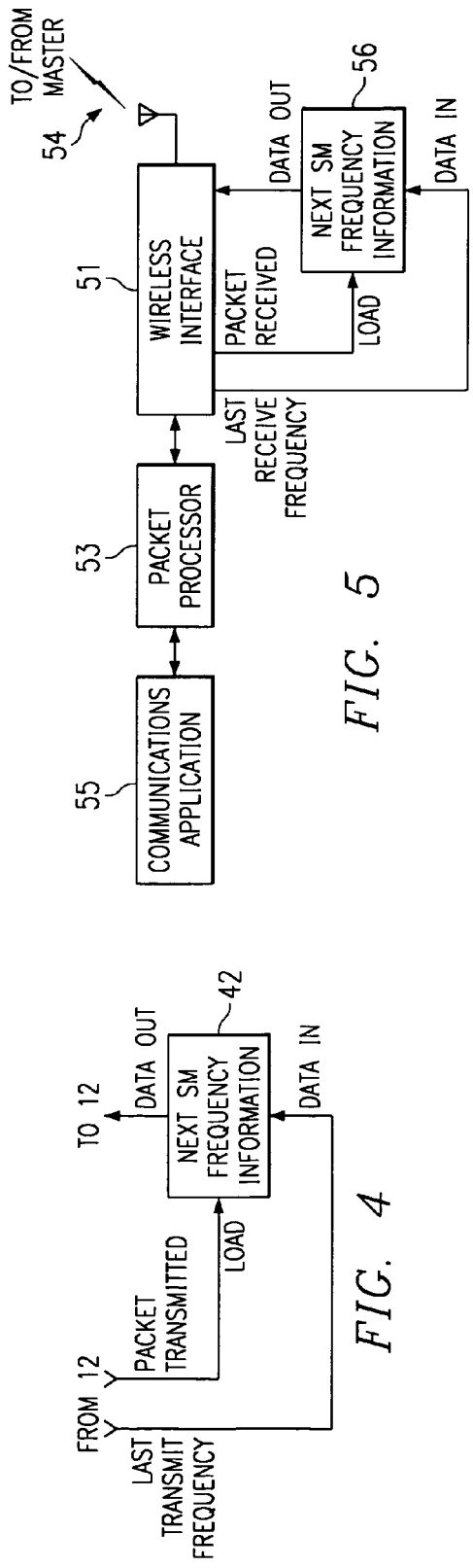
FIG. 5
FIG. 4

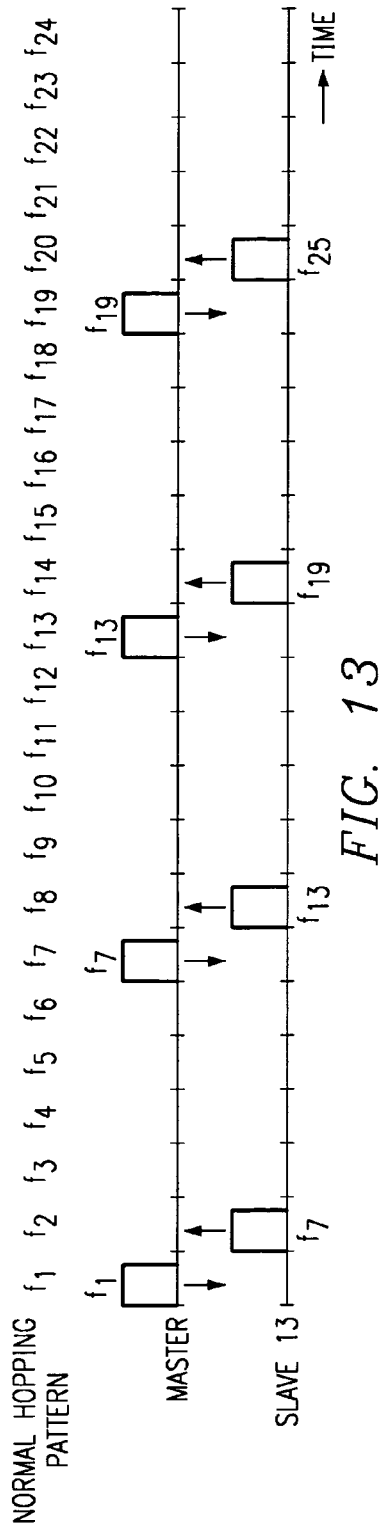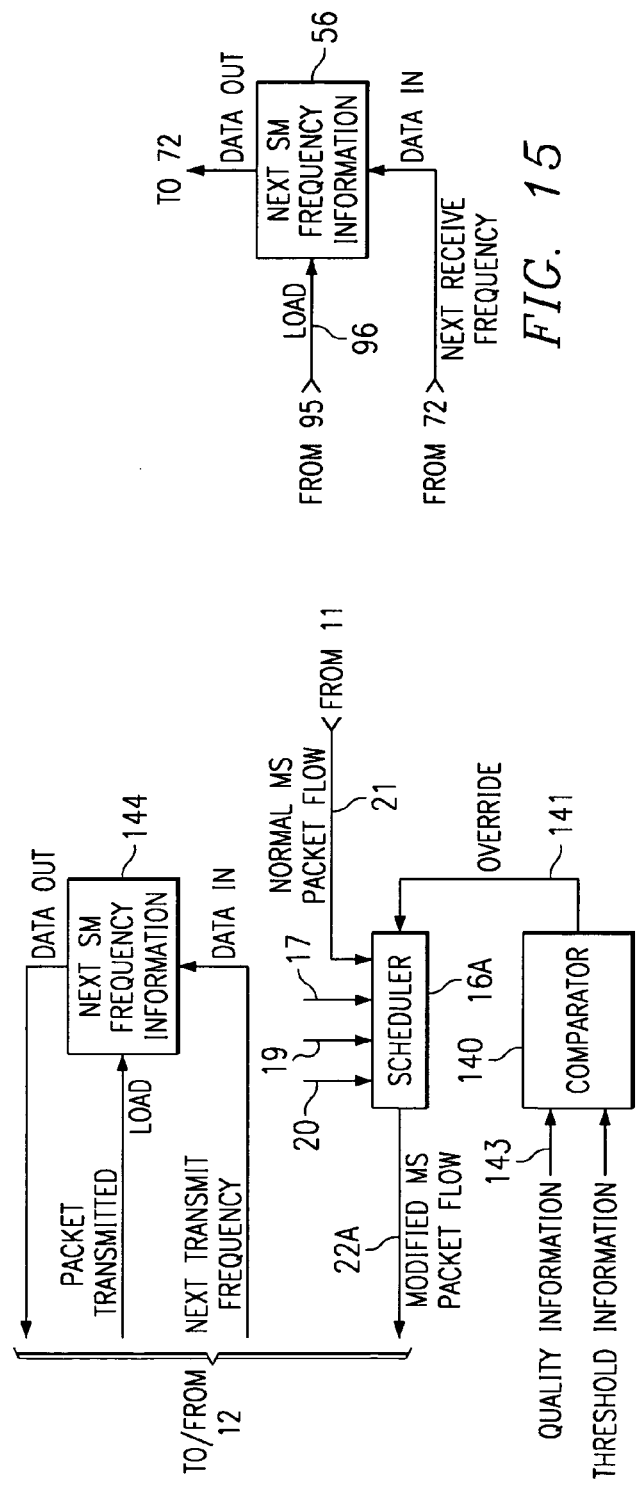

DYNAMIC SLAVE SELECTION IN FREQUENCY HOPPING WIRELESS COMMUNICATIONS

This application claims the priority under 35 U.S.C. 119(e)(1) of copending U.S. provisional application No. 60/185,937, filed on Feb. 29, 2000.

FIELD OF THE INVENTION

The invention relates generally to wireless communications and, more particularly, to frequency hopping wireless communications.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and a maximum asymmetric data transfer rate of 723 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scattemets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Frequency hopping permits operation in noisy environments and permits multiple piconets to exist in close proximity. The frequency hopping scheme permits up to 1600 hops per second over 79 1-MHZ channels or the entire 2.4 GHz ISM spectrum. Various error correcting schemes permit data packet protection by 1/3 and 2/3 rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

In frequency hopping wireless communications systems such as the Bluetooth system, there can be considerable variation in the quality of the channel at various frequencies due, for example, to different fading and interference conditions at each frequency. Transmission on frequencies with low $E_b/(N_O+I_O)$ (signal-to-noise+interference ratio) usually results in many bit errors, which leads either to poor voice quality in voice transmissions or lost data packets in data transmissions.

It is therefore desirable to avoid transmission on frequencies with a low signal-to-noise plus interference ratio.

The present invention monitors the quality of various frequency channels between first and second frequency hopping wireless communication devices. Based on the monitored quality information, communications between the first and second devices can be scheduled with respect to a predetermined frequency hopping pattern such that the communications are advantageously transmitted on selected frequencies that are more likely than others to provide acceptable communication performance.

BRIEF DESCRIPTION OF THE DRAWINGS

FIG. 3 diagrammatically illustrates exemplary ACL communications between a master device and two slave devices according to the invention.

FIG. 4 diagrammatically illustrates pertinent portions of exemplary embodiments of the master device of FIG. 3.

FIG. 5 diagrammatically illustrates pertinent portions of an exemplary embodiment of the slave devices of FIG. 3.

FIG. 13 diagrammatically illustrates a modified slave frequency hopping pattern utilized by the present invention.

FIG. 14 diagrammatically illustrates pertinent portions of exemplary embodiments of a master device that supports the modified slave frequency hopping pattern of FIG. 13.

FIG. 15 diagrammatically illustrates pertinent portions of an exemplary embodiment of a slave device which implements the modified slave frequency hopping pattern illustrated in FIG. 13.

DETAILED DESCRIPTION

Figure 1:
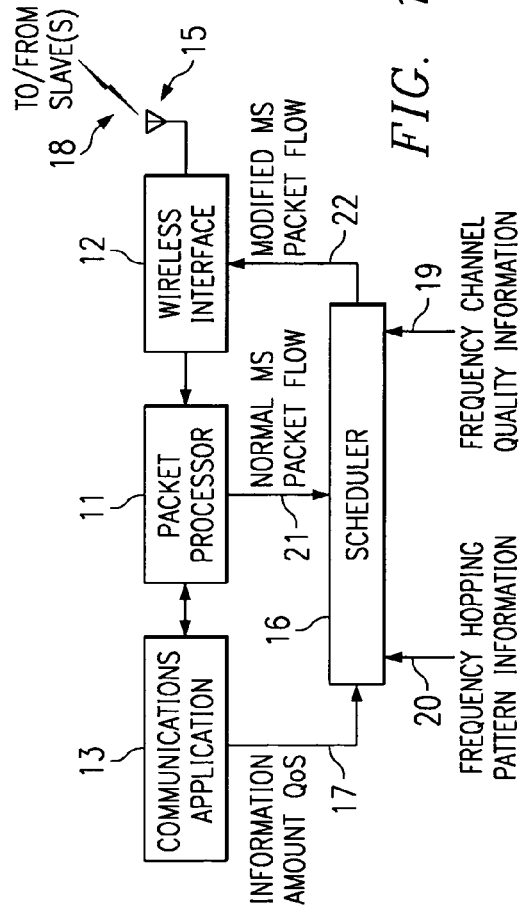
FIG. 1 diagrammatically illustrates pertinent portions of exemplary embodiments of a master device according to the invention.

FIG. 1 diagrammatically illustrates pertinent portions of exemplary embodiments of a master device according to the invention, for example a Bluetooth master device such as described above. The device of FIG. 1 includes a packet processor 11 coupled for communications with a communications application 13 and a wireless communications interface 12. The communications application 13 provides communication information to the packet processor 11, which can use well-known conventional techniques to assemble packets suitable for communication of the information received from the communications application 13. The assembled packets are then forwarded at 21 to a scheduler 16 which produces therefrom a modified packet flow at 22. This modified packet flow is input to the wireless communications interface 12, which can use well-known conventional wireless communication techniques to transmit the received packets, via one or more antennas at 15, across a wireless communication link 18 (for example a Bluetooth radio link) to one or more slave devices. Similarly, the wireless communications interface 12 can receive packets from the slave device(s) via the wireless communication link 18, again using well-known conventional techniques, and can forward the received packets to the packet processor 13.

The packet processor 13 can use conventional techniques to disassemble the received packets and forward to the communications application 13 the information contained in the received packets.

The scheduler 16 is operable in response to frequency channel quality information at 19, frequency hopping pattern information at 20, and information received at 17 from the communications application 13 for scheduling master-to-slave transmissions so as to avoid frequencies which are known to provide poor communication performance and utilize instead frequencies which are known to provide adequate communication performance. In some embodiments, even some frequencies which provide adequate communication performance are avoided in favor of frequencies which provide even better communication performance, in order to enhance the quality-of-service for selected communications.

The scheduler 16 includes an input 19 for receiving conventionally available information indicative of the quality of the channel to each slave for all available transmit frequencies, so that the scheduler will know the best frequencies available for transmission to each slave. The scheduler 16 also has an input 20 for receiving conventionally available information indicative of the normal frequency hopping pattern utilized by the wireless communications interface 12. The scheduler 16 also receives at 21 from the packet processor 11 the normal flow of master-to-slave (MS) packets conventionally produced by the packet processor 11 from the communication information provided by communications application 13. Based on the frequency hopping pattern information at 20 and the frequency channel quality information at 19, the scheduler 16 outputs at 22 to the wireless communications interface 12 a modified master-to-slave packet flow that avoids poor frequencies and utilizes stronger frequencies. The scheduler can also receive at 17 information indicative of the quality-of-service required for communication to a given slave, and/or the amount of information that needs to be transmitted to a given slave. The quality-of-service information can be used by the scheduler to select a best frequency from among a plurality of adequate frequencies for transmission to a given slave. If the information at 17 indicates that a large amount of information needs to be transmitted to a given slave, the scheduler may increase the size of that slave's packet(s) in the modified packet flow 22.

The frequency channel quality information at 19 can, in some Bluetooth embodiments, be based upon the value of the correlation with the sync word for packets received by the master. If the sync word correlation value is high, then the $E_b(N_O+I_O)$ will usually be high. Another exemplary indicator of frequency channel quality is the CRC (cyclic redundancy code) of received data packets. This CRC can be checked to determine whether the packet was received correctly, which would indicate whether or not the channel is acceptable. Another example of frequency channel quality information is the conventional Bluetooth acknowledgment (ACK) or negative acknowledgment (NAK) received from the slave device(s) in response to a previous master-to-slave transmission, the negative acknowledgment indicating a potential problem with the quality of that frequency channel. Additionally, an estimate of the coherence bandwidth can be made to determine whether nearby frequencies will have fading characteristics that are similar to a given frequency, thus providing additional frequency channel quality information.

As an example of the operation of scheduler 16, assume that the master device of FIG. 1 has data packets for transmission to first and second slave devices. If the frequency specified by the normal frequency hopping pattern for the master device's next transmission to the first slave device is, for example, in a deep fade for the channel to the first slave device, but the channel to the second slave device on that frequency is very good, then the scheduler 16 would choose that frequency for transmission to the second slave device, because transmission of a packet to the second slave device on that frequency is more likely to be successful than transmission of a packet to the first slave device on that frequency.

As another example, other factors such as the amount of information that needs to be transmitted to a given slave device, the latency requirements (e.g., a data file can tolerate a longer total transmission delay than real-time applications such as voice), and the mean channel attenuation can also be taken in account. For example, if the first slave device is much closer to the master device than is the second slave device, so that the mean channel attenuation to the first slave device is smaller than to the second slave device, then the scheduler 16 may choose to transmit to the second slave device on the frequency specified by the frequency hopping pattern for transmission to the first slave device, even when the channel to the first slave device is better for that frequency. Because the mean channel attenuation to the first slave device is smaller, transmission to the first slave device on another upcoming frequency, which may provide inferior performance relative to the frequency specified by the frequency hopping pattern for transmission to the first slave device, can still be expected to be adequate for the transmission to the first slave device.

In a further example, if the channel quality for the frequency specified by the normal frequency hopping pattern for transmission to a given slave is very good, and/or if the master device has a large amount of information for transmission to that slave, then the scheduler 16 may choose to send a larger packet to that slave to take advantage of the good channel quality. Also, if it is determined that an upcoming frequency in the normal frequency hopping pattern provides a poor channel to all of the slave devices, for example due to a temporary fading condition, then the scheduler 16 may choose to avoid that upcoming frequency by transmitting a larger packet to one of the slaves before the poor frequency is reached. In systems such as the Bluetooth system, the transmission frequency does not change in the middle of the packet, so the identified poor frequency can be avoided (i.e., bypassed) until its quality improves.

In another exemplary embodiment, both the master-to-slave (MS) transmission frequency and the slave-to-master (SM) transmission frequency specified by the normal frequency hopping pattern can be considered by the scheduler 16. In such embodiments, the scheduler evaluates the channel quality of both the master-to-slave frequency and the corresponding slave-to-master frequency for a plurality of possible master-to-slave/slave-to-master frequency pairs, and selects a pair that provides acceptable channel quality. The aforementioned technique of increasing the size of the master-to-slave packet can also be used to bypass poor frequencies until a master-to-slave/slave-to-master frequency pair of acceptable quality is reached.

Figure 2:
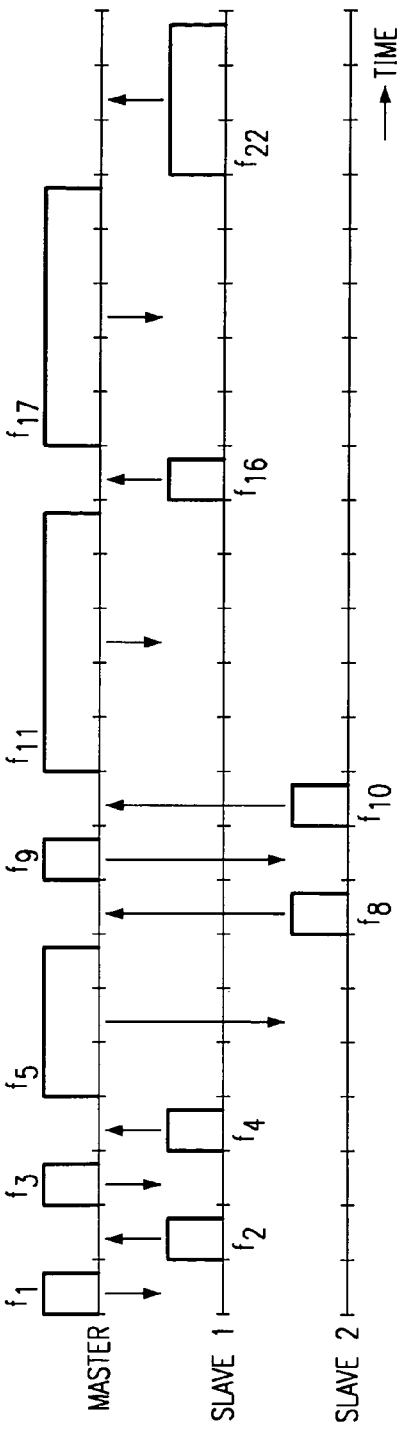
FIG. 2 diagrammatically illustrates exemplary ACL communications between the master device of FIG. 1 and a pair of conventional slave devices.

FIG. 2 diagrammatically illustrates exemplary Bluetooth ACL (Asynchronous Connection-Less) communication of packets between the master device of FIG. 1 and two conventional ACL slave devices. In the example of FIG. 2, the scheduler 16 sends the first two packets to slave 1 on frequencies $f_1$ and $f_3$ of the normal frequency hopping pattern, because the channel quality to and from slave 1 is better than the channel quality to and from slave 2. Slave 1 responds on the frequencies $f_2$ and $f_4$ specified by the normal frequency hopping pattern. For the third and fourth transmissions on frequencies $f_5$ and $f_9$, the scheduler of FIG. 1 chooses to transmit to slave 2, and for the fifth and sixth transmissions on frequencies $f_{11}$ and $f_{17}$, the scheduler chooses to transmit again to slave 1. As shown in FIG. 2, both the master and the slave devices transmit on the frequencies specified by the normal frequency hopping pattern, and the master device transmits extended length packets (conventionally available in Bluetooth systems) on frequencies $f_5$, $f_{11}$ and $f_{17}$. As mentioned above, extended packet lengths may be specified by the scheduler 16, for example, in order to take advantage of good channels and/or to accommodate larger data transmissions.

FIG. 3 diagrammatically illustrates exemplary Bluetooth ACL communication of ACL packets between the master device of FIG. 1 and two slave devices according to the present invention. In the example of FIG. 3, the master transmit operation is the same as in FIG. 2, but the slave devices slave 3 and slave 4 in FIG. 3 deviate from the normal frequency hopping pattern to use the same frequency that was just used by the master. This permits better use of the good frequencies identified by the scheduler 16 of FIG. 1, because these good frequencies are used in both the master-to-slave transmission and the immediately following slave-to-master transmission.

FIG. 4 (taken together with FIG. 1) diagrammatically illustrates pertinent portions of an exemplary embodiment of the master device of FIG. 3. The embodiment of FIG. 4 includes an indicator 42 for providing to the wireless communications interface 12 of FIG. 1 information indicative of the frequency that is to be used to receive the next slave-to-master transmission. The indicator 42 can be, for example, a register having a load input and a data input coupled to the wireless communications interface 12 of FIG. 1. The load input of the register 42 is driven active by the wireless communications interface 12 each time the wireless communications interface completes a master-to-slave transmission to a given slave, whereupon information (received from the wireless communications interface 12) indicative of the frequency that was used for that master-to-slave transmission is loaded into the register 42 via the data input thereof. Thus, the indicator 42 indicates to the wireless communications interface 12 that the frequency that is to be used to receive the next slave-to-master transmission from a given slave is the same frequency as was used for the last transmission to that slave. The master device of FIG. 4 can otherwise be identical to the master device of FIG. 1.

FIG. 5 diagrammatically illustrates pertinent portions of an exemplary embodiment of the slave devices illustrated in FIG. 3. In the embodiment of FIG. 5, a packet processor 53 is coupled for bidirectional communication with a communications application 55 and a wireless communications interface 51. These components can cooperate in generally conventional fashion to permit the slave device of FIG. 5 to carry on bidirectional wireless packet communications with the master device of FIG. 4 via a wireless communications link 54. An indicator 56 is coupled to the wireless communications interface 51 for providing thereto information indicative of the next slave-to-master transmission frequency. The indicator 56 can be, for example, a data register having a load input and a data input driven by the wireless communications interface 51. The load input is driven active each time the wireless communications interface 51 receives a master-to-slave transmission, whereupon information (received from the wireless communications interface 51) indicative of the frequency that was used to receive that master-to-slave transmission is loaded into register 56 via the data input thereof. Thus, the indicator 56 indicates to the wireless communications interface 51 that the frequency to be used for the next slave-to-master transmission is the same as the frequency that was used to receive the most recent master transmission.

Figure 6:
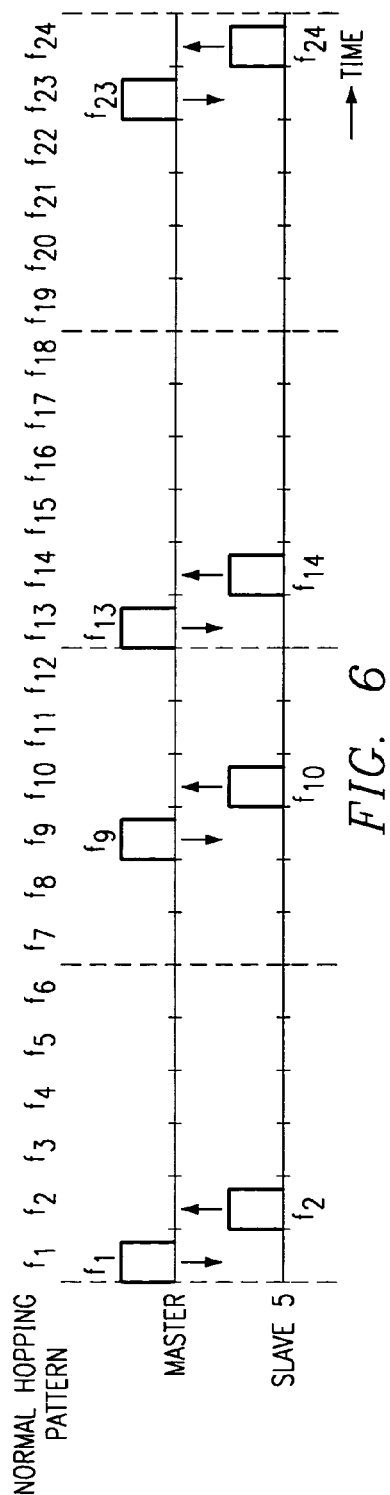
FIG. 6 diagrammatically illustrates exemplary SCO link communications between the master device of FIG. 1 and a further slave device according to the invention.

FIG. 6 diagrammatically illustrates exemplary communications between the master device of FIG. 1 and a slave device according to the present invention, using Bluetooth synchronous connection-oriented (SCO) links. Bluetooth SCO links reserve frequency/timeslot combinations at regular intervals for applications such as voice calls. When using SCO links, the scheduler 16 of FIG. 1 can perform the scheduling in blocks defined by the broken lines in FIG. 6. In the example of FIG. 6, each block includes six time slots, three for master-to-slave links and three for slave-to-master links. Each SCO slave will receive a packet within each block, but the time slot (and thus the frequency) selected by the scheduler for transmission to a given slave can vary from block to block. This requires the slave devices to listen to the master during all master-to-slave time slots.

For a given slave, such as slave 5 in FIG. 6, the scheduler 16 of FIG. 1 selects the time (and thus frequency) for transmission to that slave. In the example of FIG. 6, the frequencies $f_1$, $f_9$, $f_{13}$ and $f_{23}$ may be best in the respective blocks for transmission to slave 5, so the scheduler can choose to transmit to slave 5 using these frequencies. Slave 5 responds on the frequencies specified by the normal frequency hopping pattern.

Figure 7:
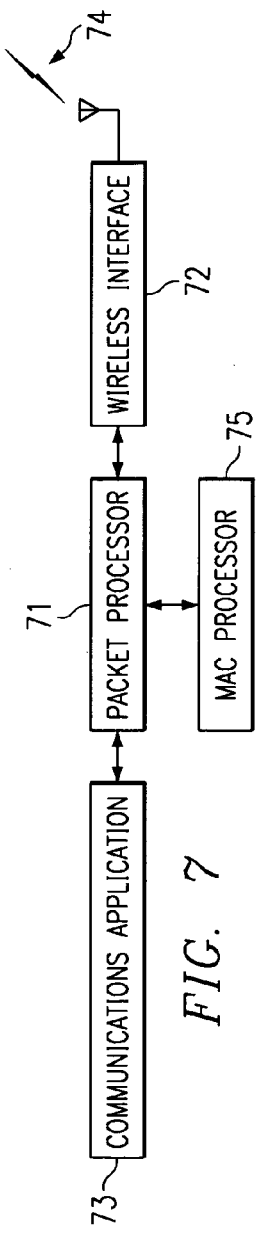
FIG. 7 diagrammatically illustrates pertinent portions of an exemplary embodiment of the slave device of FIG. 6.

FIG. 7 diagrammatically illustrates an exemplary embodiment of the slave device illustrated in FIG. 6. The embodiment of FIG. 7 includes a packet processor 71 coupled for bidirectional communication with a communications application 73 and a wireless communications interface 72. These components can cooperate in generally conventional fashion to permit bidirectional wireless packet communication with the master device of FIG. 1 via a wireless communication link 74. The embodiment of FIG. 7 includes a MAC (media access control) processor 75 coupled to the packet processor 71 for monitoring the packets received during the master-to-slave time slots of FIG. 6 and determining which of those packets is addressed to the slave device of FIG. 7, and should thus be further processed by the packet processor 71. This permits cooperation with the scheduler's ability to choose any of the three possible master-to-slave frequencies of each block in FIG. 6 for transmission to the slave device of FIG. 7.

Figure 8:
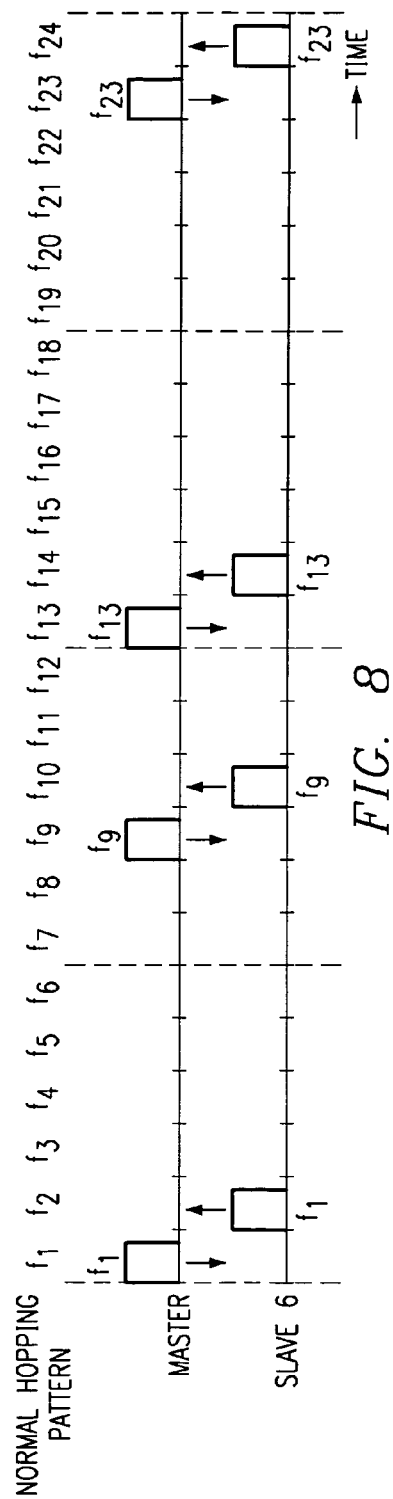
FIG. 8 diagrammatically illustrates exemplary SCO link communications between the master device of FIG. 4 and a further slave device according to the invention.

FIG. 8 diagrammatically illustrates exemplary communications between the master device of FIG. 4 and a slave device according to the invention, using Bluetooth SCO links. In the example of FIG. 8, the master device transmits to slave 6 in the same manner described above with respect to FIG. 6. However, in the example of FIG. 8, slave 6 repeats the master's frequency in generally the same manner described above with respect to FIG. 3.

Figure 9:
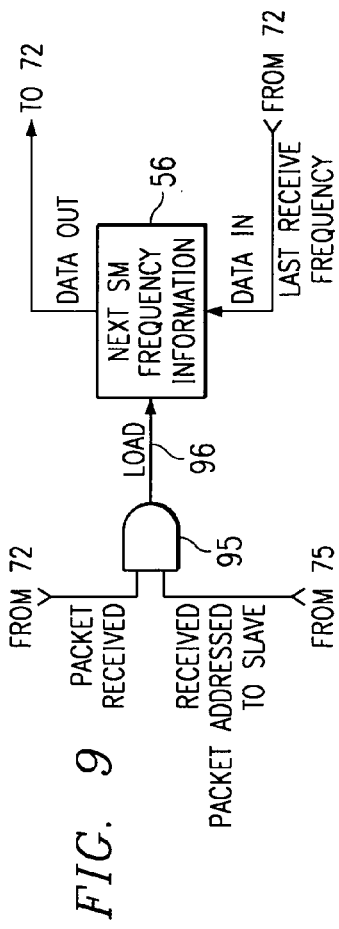
FIG. 9 diagrammatically illustrates pertinent portions of an exemplary embodiment of the slave device of FIG. 8.

FIG. 9 (taken together with FIG. 7) illustrates an exemplary embodiment of the slave device illustrated in FIG. 8. The slave device of FIG. 9 generally combines the features of the FIG. 7 slave device with the slave-to-master transmission frequency indicator 56 of FIG. 5. In the FIG. 9 slave device, the load input of the register 56 is driven active by the output 96 of AND gate 95 each time a packet addressed to the slave device (as determined by the MAC processor of FIG. 7) is received. This arrangement permits the slave device to receive a packet on any of the three available frequencies in any of the blocks delineated by broken lines in FIG. 8, and also to use for transmission back to the master device the frequency on which was received the most recent packet addressed to the slave device, also as shown in FIG. 8. The slave device of FIG. 9 can otherwise be identical to the slave device of FIG. 7.

Figure 10:
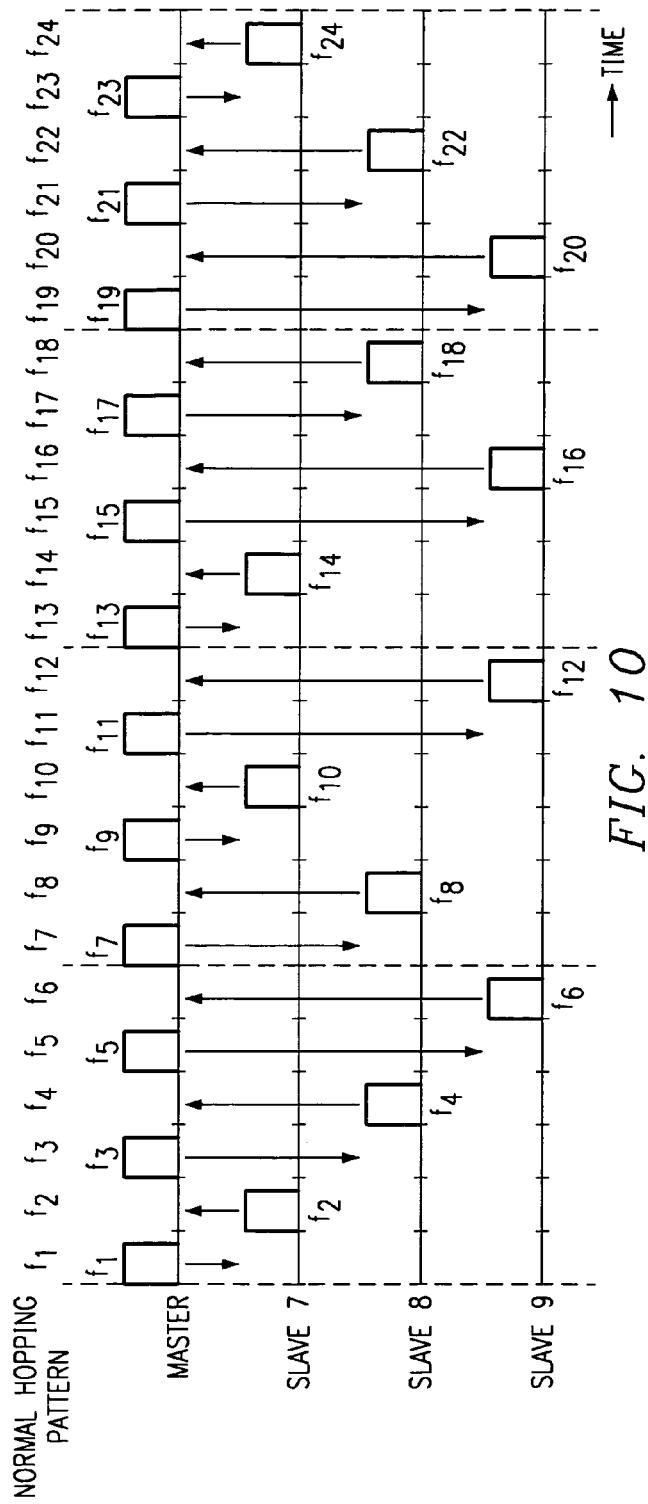
FIG. 10 diagrammatically illustrates exemplary SCO link communications between the master device of FIG. 1 and a plurality of the slave devices of FIG. 7.

FIG. 10 diagrammatically illustrates exemplary Bluetooth SCO link communications between the master device of FIG. 1 and three of the slave devices illustrated in FIG. 7. As illustrated in FIG. 10, the master device transmits to each of slaves 7–9 within each of the blocks delineated by broken lines, and the order of the transmissions to the various slaves is dictated by operation of the scheduler 16, as described in detail above. Also in this example, the master device and all of the slave devices use the transmission frequencies specified by the normal frequency hopping pattern.

Figure 11:
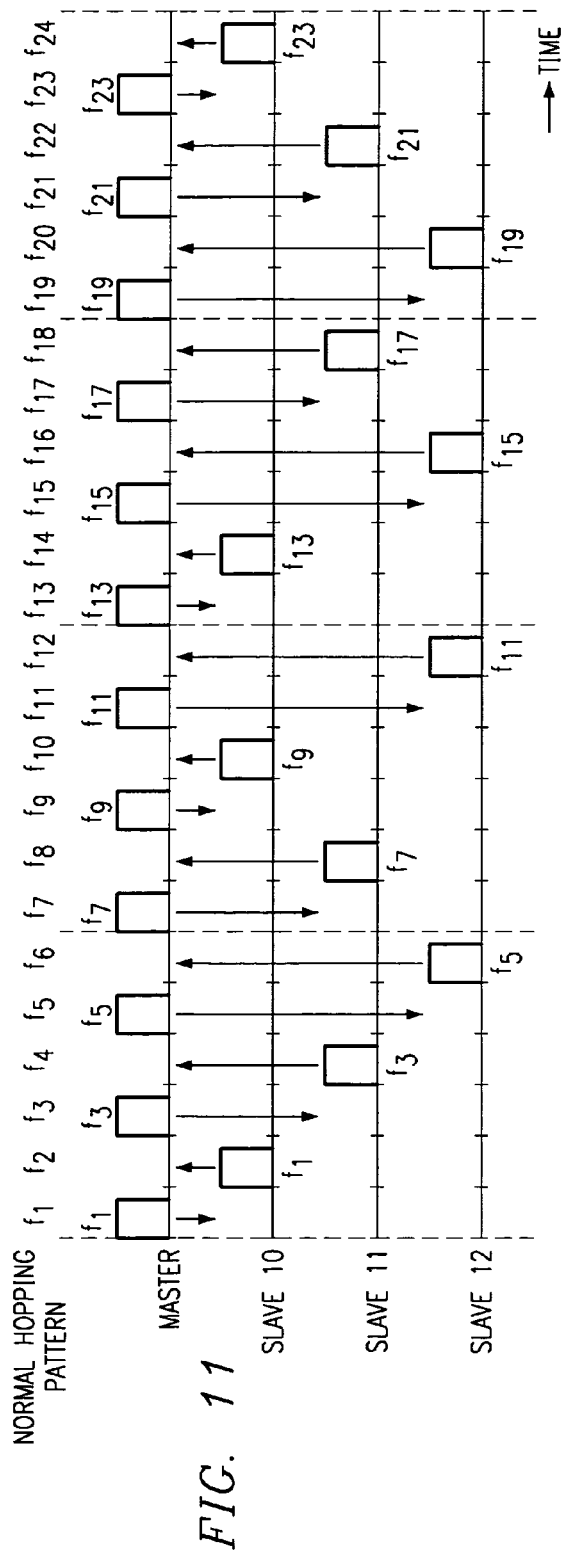
FIG. 11 diagrammatically illustrates exemplary SCO link communications between the master device of FIG. 4 and a plurality of the slave devices of FIG. 9.

FIG. 11 illustrates exemplary Bluetooth SCO link communications between the master device of FIG. 4 and three of the slave devices of FIG. 9. The transmit operation of the master device illustrated in FIG. 11 is the same as illustrated in FIG. 10, but slaves 10–12 repeat the frequency of the most recently received packet when transmitting back to the master device.

Figure 12:
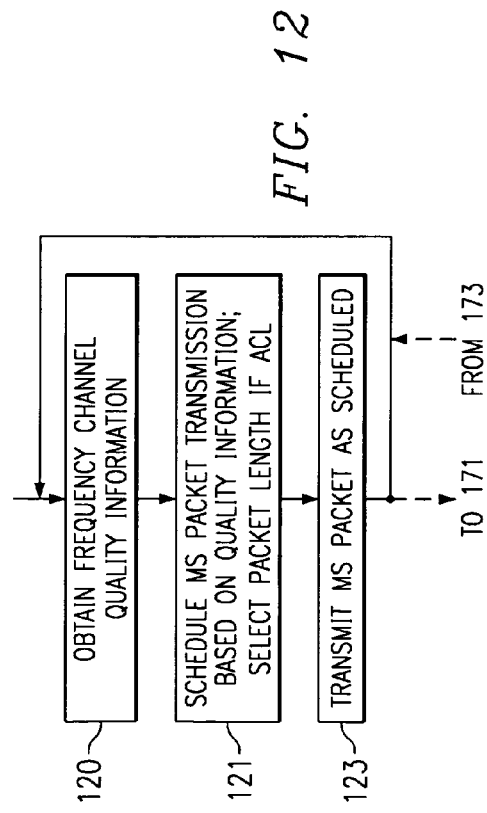
FIG. 12 illustrates exemplary operations which can be performed by the master device embodiments of FIGS. 1 and 4.

FIG. 12 illustrates exemplary operations which can be performed by the master devices of FIGS. 1 and 4. After obtaining frequency channel quality information at 120, a packet transmission to a given slave is scheduled at 121 based on the quality information. For Bluetooth ACL links, the scheduling can also include selecting the packet length based on the quality information and the amount of information that needs to be transmitted to the slave. Thereafter, the packet is transmitted as scheduled at 123, after which the illustrated operations can be repeated.

FIG. 13 diagrammatically illustrates a modified slave hopping frequency that can be utilized by the present invention, for example, in higher Doppler environments. In FIG. 13, slave 13 transmits back to the master device on the frequency that the normal frequency hopping pattern specifies for the master device's next transmission to slave 13. Such operation advantageously permits the master device to measure the quality of the slave-to-master transmit frequency relatively soon before the master is scheduled to transmit to the slave device on that same frequency.

FIG. 14 (taken together with FIG. 1) diagrammatically illustrates pertinent portions of exemplary embodiments of a master device which combines the operation of the scheduler 16 of FIG. 1 with the modified slave frequency hopping pattern illustrated in FIG. 13. The master device of FIG. 14 includes a scheduler 16A that is generally similar to the scheduler 16 of FIG. 1, but also includes an override input that, for a given master-to-slave packet, causes the scheduler 16A to override the scheduling operations described above with respect to scheduler 16, and instead schedule that packet for the same frequency/time slot that would be assigned to it in the normal MS packet flow (i.e., the frequency/time slot specified by the normal frequency hopping pattern). Thus, the scheduler 16A can produce a modified MS packet flow 22A that differs from the modified MS packet flow 22 of FIG. 1. The override input is driven by an output 141 of a comparator 140. An input 143 of the comparator 140 receives quality information conventionally derived from a slave transmission received on a frequency on which the master device is next scheduled (by the normal frequency hopping pattern) to transmit to the slave, for example, quality information derived from slave 13's transmission on $f_7$ in FIG. 13. If the comparator 140 determines that the quality associated with that frequency exceeds a predetermined threshold quality, then the comparator output 141 activates the override input of scheduler 16A. Otherwise, the override input remains inactive.

The master device of FIG. 14 also includes an indicator 144 which provides to the wireless communications interface 12 information indicative of the frequency that will be used to receive the next slave-to-master transmission. The indicator 144 can be, for example, a register whose load input is driven active by the wireless communications interface 12 each time the wireless communications interface 12 completes a transmission to a slave device. When the load input is driven active, the register 144 is loaded via its data input with information (received from wireless communications interface 12) indicative of the frequency specified by the normal frequency hopping pattern for the next transmission to that slave device. Thus, the register 144 indicates after each master-to-slave transmission that the next transmission from that slave is to be received on the frequency specified by the normal frequency hopping pattern for the next master transmission to that slave.

FIG. 15 (taken together with FIGS. 7 and 9) diagrammatically illustrates pertinent portions of an exemplary embodiment of a slave device which can implement the modified slave frequency hopping pattern illustrated in FIG. 13. The embodiment of FIG. 15 is similar to the embodiment of FIG. 9, with the exception that the data input of register 56 receives (from wireless communications interface 74) information indicative of the frequency specified by the normal frequency hopping pattern for receiving the next master transmission. Thus, register 56 indicates to the wireless communications interface 74 that the next slave-to-master transmission is to be performed on the frequency specified by the normal frequency hopping pattern for receiving the next master transmission.

Figure 16:
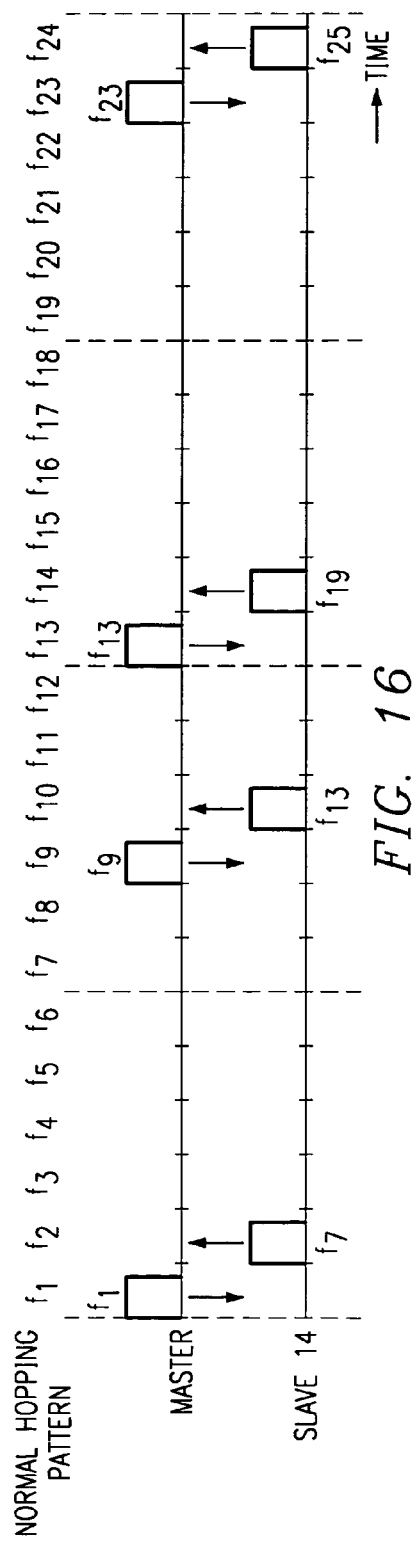
FIG. 16 diagrammatically illustrates exemplary SCO link communications between the master device of FIG. 14 and the slave device of FIG. 15.

FIG. 16 illustrates exemplary Bluetooth SCO link communications between the master device of FIG. 14 and the slave device of FIG. 15. In the example of FIG. 16, slave 14 transmits to the master device according to the modified frequency hopping pattern described above with respect to FIG. 13, so the master device has an opportunity to make a measurement on the frequency that is specified by the normal frequency hopping pattern for the next transmission from the master to slave 14. In the example of FIG. 16, the quality information derived by the master device from slave 14's transmission on frequency $f_7$ indicates that the quality of that frequency is less than the predetermined threshold quality (see FIG. 14), so the master device makes its next transmission to slave 14 on frequency $f_9$ as selected (in this example) by scheduler 16A when its override input is inactive, instead of on the frequency $f_7$. However, the quality information derived from slave 14's transmission on frequency $f_{13}$ indicates that the quality of $f_{13}$ exceeds the threshold quality, so the master's next transmission to slave 14 is on that same frequency $f_{13}$, as specified by the normal frequency hopping pattern (and associated with the normal MS packet flow). The slave 14 transmission on frequency $f_{19}$ is determined to have a quality that is lower than the threshold quality, so the master's next transmission to slave 14 is on frequency $f_{23}$ specified by the modified packet flow from scheduler 16 rather than on the frequency $f_{19}$ specified by the normal frequency hopping pattern.

Figure 17:
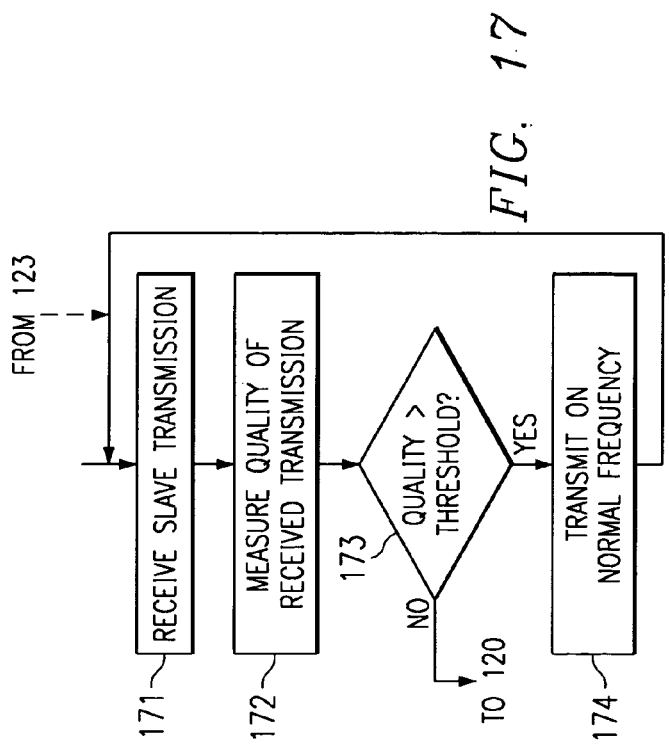
FIG. 17 illustrates exemplary operations which can be performed by the master device of FIG. 14.

FIG. 17 (taken together with FIG. 12) illustrates exemplary operations which can be performed by the master device of FIG. 14. After receiving a slave device's transmission at 171 and making a quality measurement on the received transmission at 172, it is determined at 173 whether or not the quality associated with the slave's transmission frequency exceeds a threshold quality. If so, then at 174 the frequency specified by the normal frequency hopping pattern is used for the next transmission to the slave device, after which the next transmission from the slave device is awaited at 171. If the measured quality does not exceed the threshold quality at 173, then operations can proceed to 120 in FIG. 12, in order to schedule and transmit the next packet to the slave device, after which operations can return from 123 in FIG. 12 to 171 in FIG. 17.

Figure 18:
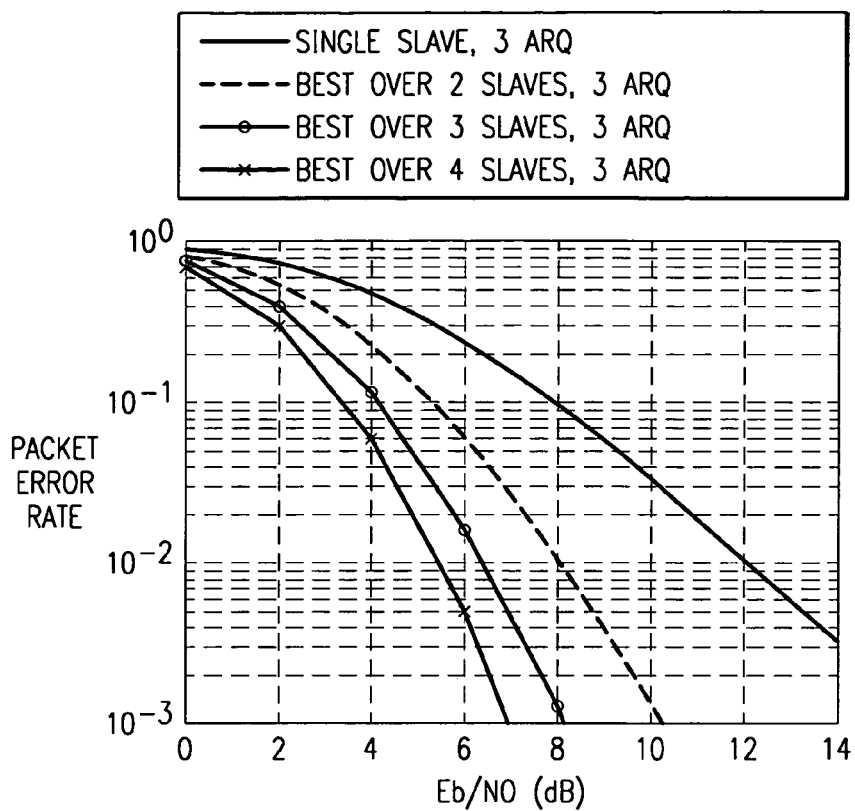
FIGS. 18–20 illustrate exemplary simulation results obtained according to the present invention.

FIG. 18 shows simulation results indicative of the gains that can be obtained for ACL links using the dynamic slave selection provided by the scheduler 16 of FIG. 1. In the simulation example of FIG. 18, retransmissions are considered and, after a packet is transmitted up to three times and is not received correctly, then the packet is considered to be lost. When the scheduler can choose between two slaves (or two frequencies), the gain in $E_b/N_O$ is 4 dB. With a choice between three slaves, the gain is 5.5 dB, and with a choice between four slaves the gain is 6.5 dB.

Figure 19:
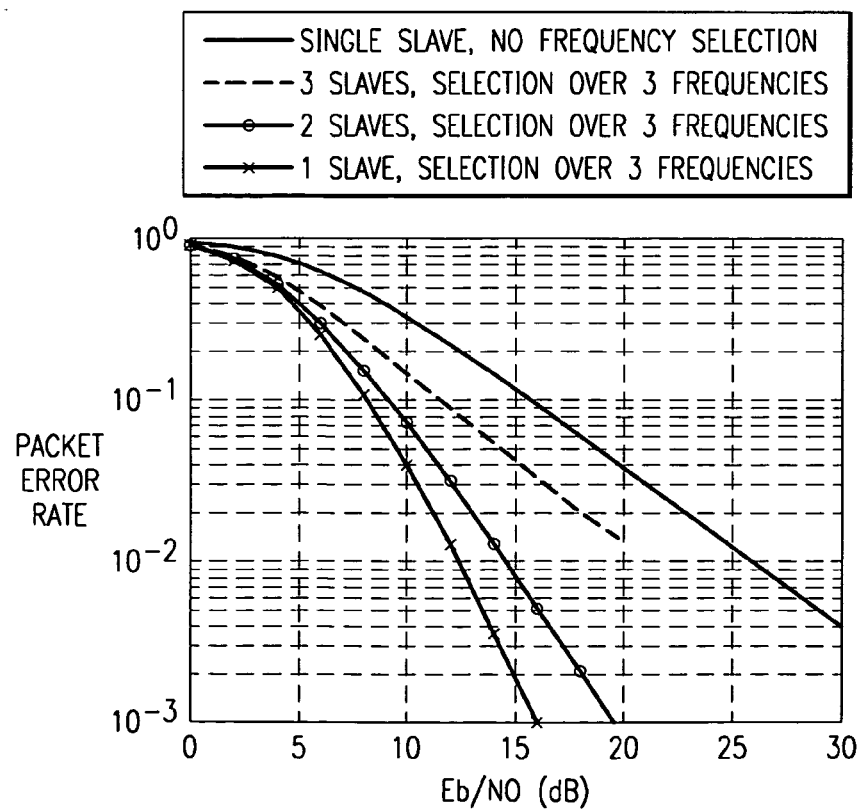

FIG. 19 shows simulation results for the gains that can be obtained for SCO links using the dynamic slave selection provided by the scheduler 16 with a block size of three master-to-slave time slots plus three slave-to-master time slots. With three simultaneous SCO links, the entire bandwidth is occupied, and the gain obtained by dynamic slave selection is 5 dB. With only two simultaneous SCO links, a gain of 12 dB can be obtained, and with a single SCO link a gain of 14 dB can be obtained. The example of FIG. 19 relates to HV3 (High-quality Voice) with no retransmissions.

Figure 20:
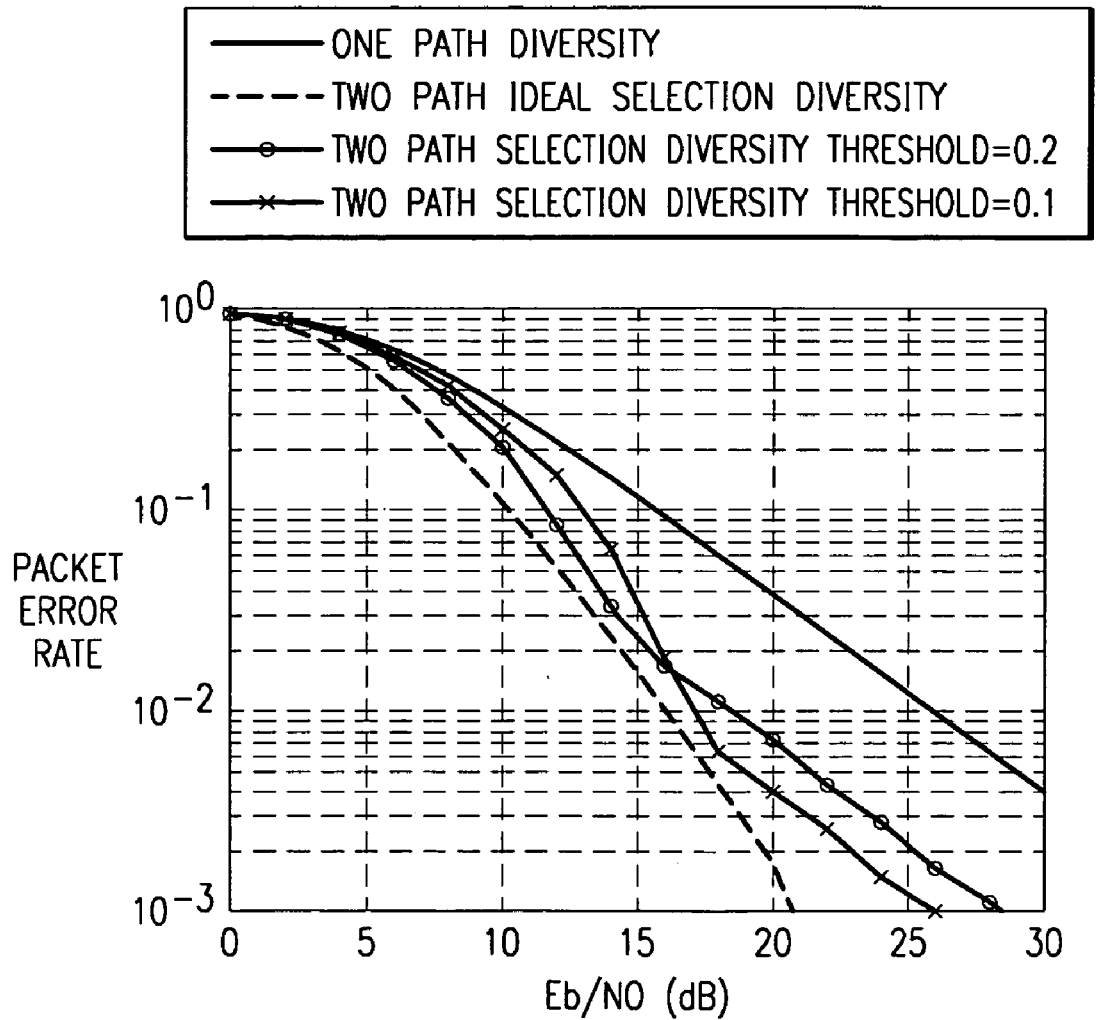

FIG. 20 shows simulation results for the gains that can be obtained for SCO links with the dynamic slave selection of the scheduler 16A of FIG. 14, but operating at a higher Doppler rate than in FIG. 19. A gain of 8 dB can be obtained, which is close to the 10 dB that could be obtained with ideal two path selection diversity.

It will be evident to workers in the art that the embodiments described above with respect to FIGS. 1–17 can be readily implemented, for example, by suitable modifications in software, hardware, or a combination of software and hardware, in conventional frequency hopping wireless communication devices, such as the above-described Bluetooth master and slave examples.

Although exemplary embodiments of the invention are described above in detail, this does not limit the scope of the invention, which can be practiced in a variety of embodiments.

What is claimed is:

1. A method of controlling wireless communication from a first device to a second device via a wireless communication link, comprising:
receiving a frequency hopping pattern comprising a plurality of frequencies from a finite frequency band;
obtaining information indicative of communication quality provided by one of said frequencies after the step of receiving;
selecting a frequency from the plurality of frequencies on which to transmit a selected communication to the second device in response to the information indicative of communication quality; and
transmitting the selected communication to the second device via the wireless communication link on the selected frequency at a time when the selected frequency is specified by the frequency hopping pattern for a transmission by the first device.

2. The method of claim 1, wherein said one frequency is specified by the frequency hopping pattern for transmission of the selected communication.

3. The method of claim 2, wherein the selected frequency is a frequency other than said one frequency.

4. The method of claim 3, wherein said obtaining step includes obtaining information indicative of communication quality provided by the selected frequency and determining that the selected frequency provides better communication quality than said one frequency.

5. The method of claim 3, wherein said transmission for which the selected frequency is specified by the frequency hopping pattern is a transmission from the first device to a third device.

6. The method of claim 2, wherein the selected frequency is said one frequency.

7. The method of claim 1, wherein the selected frequency is said one frequency.

8. The method of claim 1, wherein said obtaining step includes obtaining information indicative of communication quality provided by a plurality of the frequencies of the frequency hopping pattern.

9. The method of claim 1, wherein said step of transmitting the selected communication includes the first device transmitting a data packet to the second device at said time when the selected frequency is specified by the frequency hopping pattern for a transmission by the first device.

10. The method of claim 9, wherein said step of transmitting a data packet includes the first device transmitting the data packet to the second device at said time and also at a time when the frequency hopping pattern specifies a further frequency other than the selected frequency for a further communication involving the first device.

11. The method of claim 10, wherein the further communication is a transmission from the first device.

12. The method of claim 10, wherein the further communication is a transmission to the first device.

13. The method of claim 1, including the second device transmitting a further communication to the first device via the wireless communication link on the selected frequency in response to the selected communication.

14. The method of claim 1, including the second device transmitting a further communication to the first device via the wireless communication link on said one frequency, said obtaining step including obtaining the information indicative of communication quality based on said further communication.

15. The method of claim 14, wherein said one frequency is specified by the frequency hopping pattern for transmission of the selected communication.

16. The method of claim 15, including comparing the information indicative of communication quality to a communication quality threshold, said selecting step including selecting said one frequency in response to a determination that the communication quality provided by said one frequency exceeds the communication quality threshold.

17. The method of claim 1, wherein the wireless communication link is a Bluetooth ACL link, and the first and second devices are, respectively, Bluetooth master and slave devices.

18. The method of claim 1, wherein the wireless communication link is a Bluetooth SCO link, and the first and second devices are, respectively, Bluetooth master and slave devices.

19. A frequency hopping wireless communication apparatus, comprising;
a wireless communications interface for communicating with a further frequency hopping wireless communication apparatus arranged to receive a plurality of frequencies from a finite frequency band via a wireless communication link according to a predetermined frequency hopping pattern;
a scheduler for selecting a frequency from the plurality of frequencies of the frequency hopping pattern on which to transmit a selected communication to the further apparatus, said scheduler including an input for receiving information indicative of communication quality provided by one of said frequencies, said scheduler responsive to said information for selecting the frequency from the plurality of frequencies of the frequency hopping pattern on which to transmit the selected communication; and
said wireless communications interface coupled to said scheduler and responsive thereto for transmitting the selected communication to the further apparatus on the selected frequency at a time when the selected frequency is specified by the frequency hopping pattern for a transmission by said wireless communication interface.

20. The apparatus of claim 19, wherein said one frequency is specified by the frequency hopping pattern for transmission of the selected communication.

21. The apparatus of claim 20, wherein the selected frequency is a frequency other than said one frequency.

22. The apparatus of claim 21, wherein said transmission for which the selected frequency is specified by the frequency hopping pattern is a transmission from said wireless communications interface to a frequency hopping wireless communication apparatus other than the further apparatus.

23. The apparatus of claim 20, wherein the selected frequency is said one frequency.

24. The apparatus of claim 19, wherein the selected frequency is said one frequency.

25. A frequency hopping wireless communication system, comprising:
a first frequency hopping wireless communication device;
a second frequency hopping wireless communication device for communication with said first device via a wireless communication link, said second device arranged to receive a plurality of frequencies from a finite frequency band;
said second device including a wireless communications interface for communicating with said first device via said wireless communication link on the plurality of frequencies according to a predetermined frequency hopping pattern, and a scheduler for selecting from the frequency hopping pattern a frequency on which to transmit a selected communication to said first device, said scheduler including an input for receiving information indicative of communication quality provided by one of said frequencies, said scheduler responsive to said information for selecting the frequency on which to transmit the selected communication, said wireless communications interface coupled to said scheduler and responsive thereto for transmitting the selected communication to said first device on the selected frequency at a time when the selected frequency is specified by the frequency hopping pattern for a transmission by said wireless communications interface.

26. The apparatus of claim 25, wherein said first device is responsive to the selected communication for transmitting a further communication to said second device via the wireless communication link on the selected frequency.

27. The apparatus of claim 25, wherein said one frequency is specified by the frequency hopping pattern for transmission of the selected communication, said first device operable for transmitting a further communication to said second device via the wireless communication link on said one frequency, said scheduler having a further input for receiving information indicative of whether communication quality associated with said further communication exceeds a communication quality threshold, said scheduler responsive to said further input for selecting said one frequency for transmission of the selected communication if the communication quality associated with said further communication exceeds the communication quality threshold.

28. The apparatus of claim 25, wherein the wireless communication link is a Bluetooth ACL link, and said first and second devices are, respectively, Bluetooth slave and master devices.

29. The apparatus of claim 25, wherein the wireless communication link is a Bluetooth SCO link, and said first and second devices are, respectively, Bluetooth slave and master devices.

30. The method of claim 1, wherein the wireless communication link is a Bluetooth ACL link, and the first and second devices are, respectively, Bluetooth slave and master devices.

31. The method of claim 1, wherein the wireless communication link is a Bluetooth SCO link, and the first and second devices are, respectively, Bluetooth slave and master devices.

* * * * *